US012706833B2

(12) United States Patent
Sanchez et al.

(10) Patent No.: US 12,706,833 B2
(45) Date of Patent: Aug. 11, 2026

(54) HARDWARE-ASSISTED PASSIVE APPLICATION MONITORING

(71) Applicant: Fortinet, Inc., Sunnyvale, CA (US)

(72) Inventors: Juan Ruiz Sanchez, Bellaterra (ES); Jorge Garcia Alvarez, Viladecans (ES)

(73) Assignee: Fortinet, Inc., Sunnyvale, CA (US)

( * ) Notice: Subject to any disclaimer, the term of this patent is extended or adjusted under 35 U.S.C. 154(b) by 311 days.

(21) Appl. No.: 18/375,474

(22) Filed: Sep. 30, 2023

(65) Prior Publication Data

US 2025/0112850 A1 Apr. 3, 2025

(51) Int. Cl.

*H04L 45/12* (2022.01)
*H04L 43/0829* (2022.01)
*H04L 43/087* (2022.01)

(52) U.S. Cl.

CPC ........ *H04L 45/123* (2013.01); *H04L 43/0829* (2013.01); *H04L 43/087* (2013.01)

(58) Field of Classification Search

CPC .. H04L 43/0829; H04L 43/087; H04L 45/123
See application file for complete search history.

(56) References Cited

U.S. PATENT DOCUMENTS

2020/0344163 A1* 10/2020 Gupta ..................... H04L 45/70
2021/0067442 A1* 3/2021 Sundararajan ...... H04L 47/2441
2022/0021595 A1* 1/2022 Kumar ...................... H04L 1/18
2022/0103466 A1* 3/2022 Cai ......................... H04L 45/22
2023/0072769 A1* 3/2023 Yeh .................. H04W 28/0247
2023/0116163 A1* 4/2023 Scholz ................ H04L 61/2567 370/392
2023/0117218 A1* 4/2023 Navon ................ H04L 12/4641 709/238
2024/0015569 A1* 1/2024 Doostnejad ............ H04L 47/24
2024/0259290 A1* 8/2024 Chen ...................... H04L 45/02

* cited by examiner

*Primary Examiner* — Abdullahi E Salad
(74) *Attorney, Agent, or Firm* — Law Office of Dorian Cartwright; Dorian Cartwright

(57) ABSTRACT

A processor has hardware acceleration enabled during passive link quality measurement. The processor comprises a forwarding engine to passively gather link quality details from existing network sessions concerning a plurality of links. The link quality details comprise latency, jitter and packet loss. An SD-WAN path selection module identifies a link from the plurality of links for data packets of a current session using the link quality details. A transmission module sends data packets of the current session over the selected link.

3 Claims, 4 Drawing Sheets

HARDWARE-ASSISTED PASSIVE APPLICATION MONITORING

FIELD OF THE INVENTION

The invention relates generally to computer processors, and more specifically, to a processor of gateway network device on a data communication network, having accelerated hardware assistance for passive link quality measurement.

BACKGROUND

In software-defined wide area networking (SD-WAN), performance service level agreement (SLA) monitoring measures the health of links that are connected to an SD-WAN member. If a link is broken or of low quality, routes on that link are removed, and traffic is routed through other links. The link can continue to be monitored, and when working again or when providing better quality, the routes can be reenabled. This prevents traffic from being lost or denigrated.

A path selection algorithm relies on link quality monitoring. Active monitoring: consists on generating synthetic traffic to monitor link quality. Passive monitoring: consists on examining real time traffic to gather link quality details, on a per application fashion.

Current implementations of link monitoring are software-based and typically require disabling hardware acceleration.

What is needed is a robust technique for accelerated hardware assistance for passive link quality measurement in SD-WAN path selection to support software-based link monitoring.

SUMMARY

To meet the above-described needs, methods, computer program products, and systems having accelerated hardware assistance for passive link quality measurement in SD-WAN path selection.

In one embodiment, a processor has hardware acceleration enabled during passive link quality measurement. The processor comprises a forwarding engine to passively gather link quality details from existing network sessions concerning a plurality of links. The link quality details comprise latency, jitter and packet loss. Link quality can also include voice call quality.

In another embodiment, a memory is communicatively coupled to the processor, and comprises an operating system. The operating system comprises an SD-WAN path selection module to receive the link quality details gathered by the forwarding engine of the processor. The SD-WAN path selection module identify a link from the plurality of links for data packets of a current session using the link quality details. A transmission module is communicatively coupled to the processor as an input and is communicatively coupled to the data communication network as an output. The transmission module sends data packets of the current session over the selected link.

Advantageously, computer performance is improved with faster link quality processing and network performance is improved with more efficient SD-WAN processing.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for accelerated hardware assistance for passive link quality measurement in SD-WAN path selection to support software-based link monitoring. One of ordinary skill in the art will recognize many alternative embodiments that are not explicitly listed based on the following disclosure.

Figure 2:
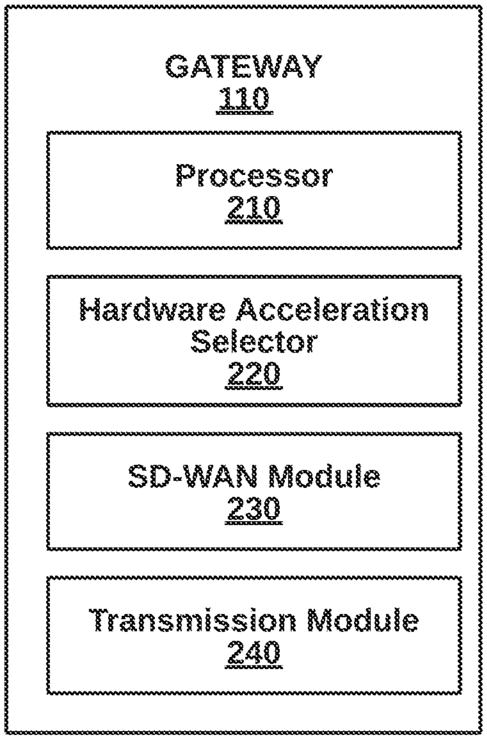
FIG. 2 is a more detailed block diagram illustrating a gateway of the system of FIG. 1, according to one embodiment.
Figure 3:
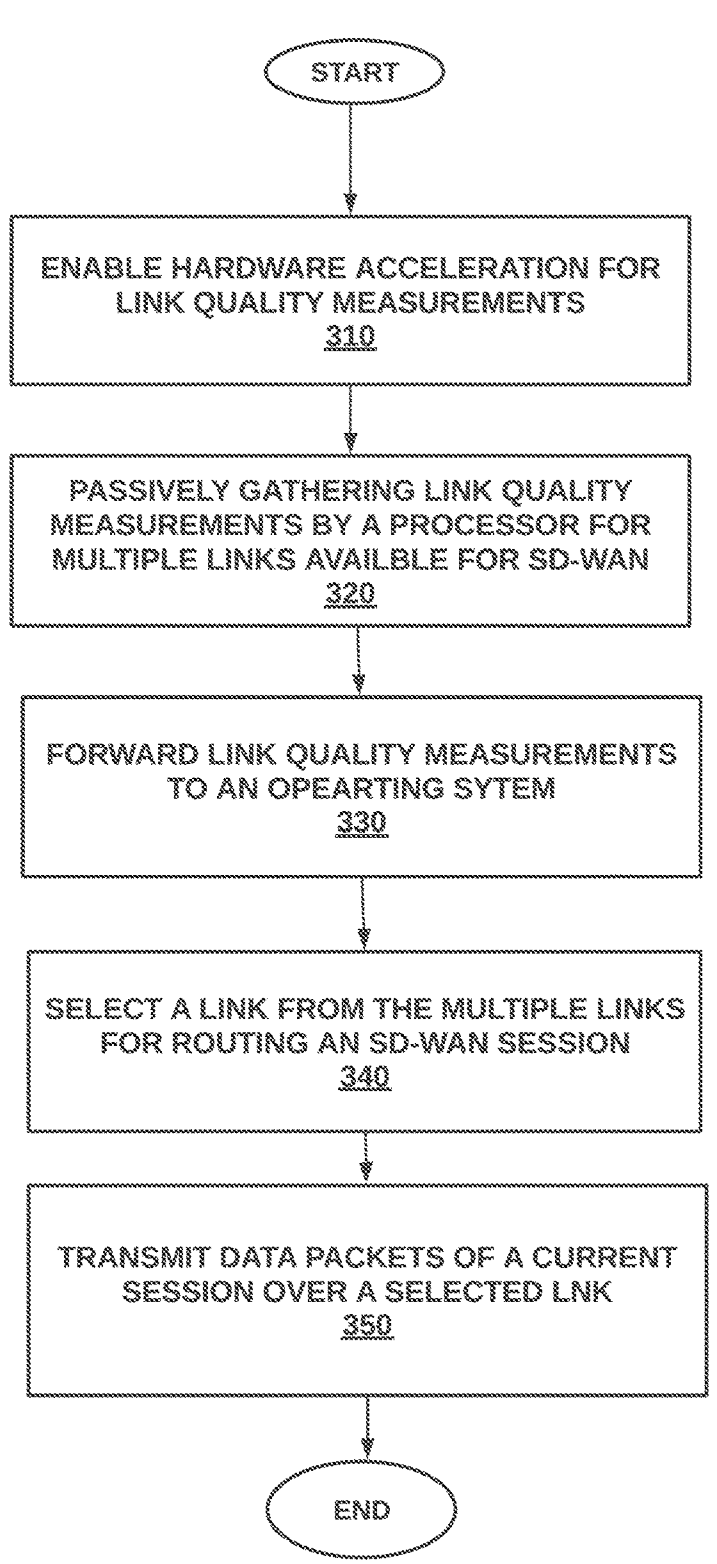
FIG. 3 is a high-level flow chart for SD-WAN processing, according to an embodiment.

I. Systems for Hardware-Assisted SD-WAN Link Selection (FIGS. 1-3)

Figure 1:
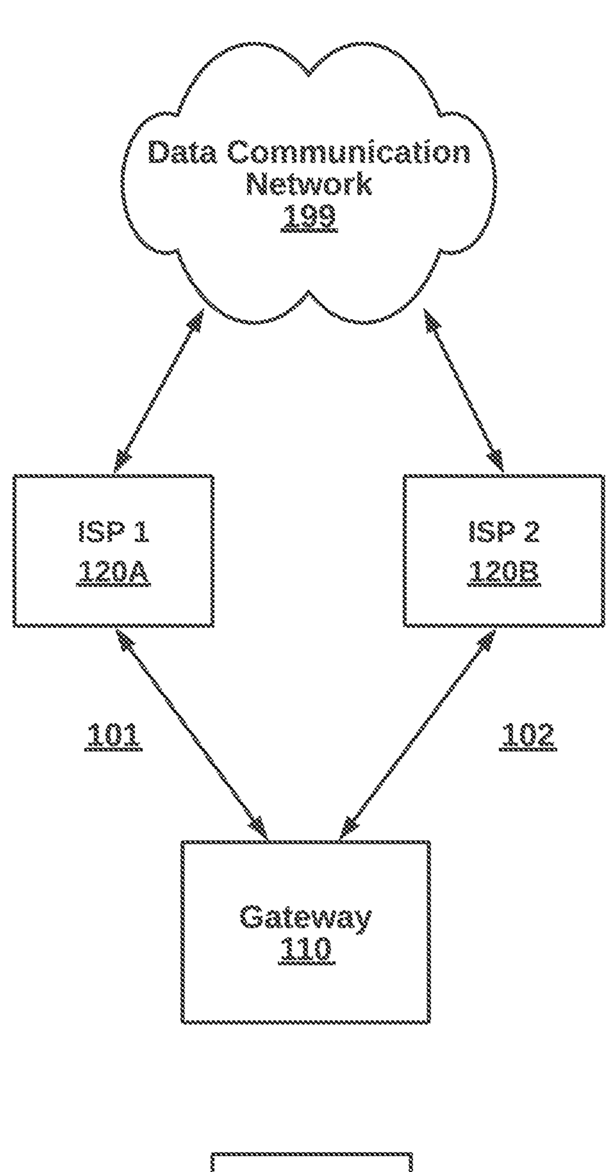
FIG. 1 is a high-level block diagram illustrating a system for SD-WAN processing, according to one embodiment.

FIG. 1 is a high-level block diagram illustrating a network system 100 for SD-WAN processing, according to one embodiment. The system 100 includes a gateway 110, ISP 1 120A, ISP 2 120B and a station 130. Other embodiments of the system 100 can include additional components that are not shown in FIG. 1, such as controllers, network gateways, routers, switches, additional access points, and additional wired or wireless stations. Many variations are possible. The components are implemented in hardware, software, or a combination of both, as shown in the example below of FIG. 4.

The gateway 110 can be connected to the data communication system via hard wire (e.g., Ethernet), in some cases. The station 130 can be connected to the data communication system 199 both via hard wire and via wireless or wired connections. The data communication network 199 can be composed of any data communication network such as an SDWAN, an SDN (Software Defined Network), WAN, a LAN, the Internet, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPv4 or Ipv6 address spaces.

The gateway 110 can implement SD-WAN by routing data packets of a session using hardware assistance for link monitoring. Generally, SD-WAN provides a software abstraction to create a network overlay and decouple network software services from underlying hardware WAN circuits. When multiple paths are available for routing, the gateway 110 identifies best available paths for routing data packet sessions. In an embodiment, different sessions can be assigned to different routes. Path selection uses health checks of links to keep a real-time status of link quality.

In the example of FIG. 1, a first route 101 uses ISP 1 120A to reach the data communication network 199 while a separate, second route 102 uses ISP2 120B. The links can use the same or different transport technology. For example, ISP 1 120A may rely on LTE while ISP 2 120B relies upon 5G or Ethernet links.

The station 130 can send and receive information over SD-WAN. For example, a VPN application or other service on the station 130 can initiate a session of data packets exchanges with a remote destination on the Internet. A voice call requires quality connections according to an SLA. The gateway 110 is then relied upon to make link selections that meet the SLA requirements.

FIG. 2 is a more detailed block diagram illustrating the gateway 110 of FIG. 1, according to an embodiment. The gateway 110 includes a processor 210, a hardware acceleration selector 220, an SD-WAN link selection module 230, and a transmission module 240. Components can be implemented in software and/or software. Many other variations of components are possible.

The processor 210 has hardware acceleration enabled during passive link quality measurement. The processor comprises a forwarding engine to passively gather link quality details from existing network sessions concerning a plurality of links. The link quality details comprise latency, jitter and packet loss, and the like.

The hardware acceleration selector 220 enables and disables hardware acceleration during certain processes. In one embodiment, the processor 210 only is enabled or disabled. In another embodiment, the processor 210 is enabled or disabled along with other supporting hardware. In some embodiments, operating systems control whether or not hardware acceleration enabled.

The SD-WAN link selection module 230 receives the link quality details gathered by the forwarding engine of the processor. The SD-WAN path selection module 230 identifies a link from the plurality of links for data packets of a current session using the link quality details.

A transmission module 240 is communicatively coupled to the processor as an input and is communicatively coupled to the data communication network as an output, to send data packets of the current session over the selected link. The transmission module 240 can comprise an Ethernet port, a 5G port, a Wi-Fi port or the like, along with transceivers, antennae and other hardware and software according to the different links.

II. Methods for Hardware-Assisted SD-WAN Link Selection (FIG. 3)

FIG. 3 is a high-level flow diagram illustrating a method 300 for accelerated hardware assistance for passive link quality measurement in SD-WAN path selection to support software-based link monitoring, according to an embodiment. The method 400 can be implemented by, for example, system 100 of FIG. 1.

At step 310, hardware acceleration is enabled during passive link quality measurement.

At step 320, passively gathering link quality details from existing network sessions concerning a plurality of links. The link quality details comprise latency, jitter and packet loss.

At step 330, link quality details are forwarded by a forwarding engine of the processor to an operating system.

At step 440, a link selected from the plurality of links for data packets of a current session using the link quality details.

At step 450, data packets of the current session are transmitted over the selected link.

III. Computing Device for SD-WAN Link Selection (FIG. 4)

Figure 4:
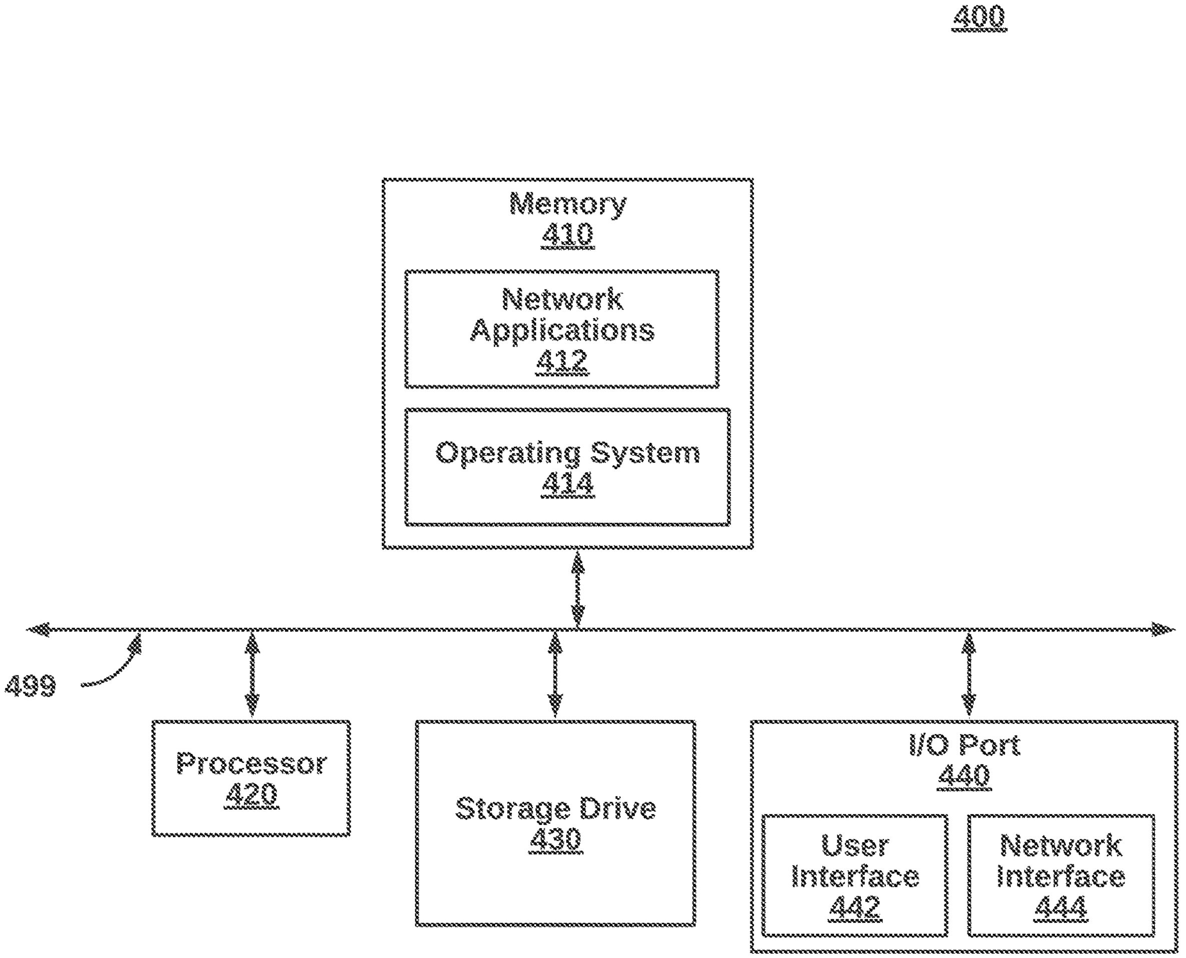
FIG. 4 is a block diagram illustrating an example computing device implementing the network system of FIG. 1, according to one embodiment.

FIG. 4 is a block diagram illustrating a computing device 400 implementing the packet processor 100 of FIG. 1, according to one embodiment. The computing device 400 is a non-limiting example device for implementing each of the components of the system 100, including the gateway 110, the ISP 1 120A, the ISP 2 120B, and station 130. Additionally, the computing device 400 is merely an example implementation itself, since the system 100 can also be fully or partially implemented with laptop computers, tablet computers, smart cell phones, Internet access applications, and the like.

The computing device 400, of the present embodiment, includes a memory 410, a processor 420, a hard drive 430, and an I/O port 440. Each of the components is coupled for electronic communication via a bus 450. Communication can be digital and/or analog, and use any suitable protocol.

The memory 410 further comprises network access applications 412 and an operating system 414. Network access applications can include 412 a web browser, a mobile access application, an access application that uses networking, a remote access application executing locally, a network protocol access application, a network management access application, a network routing access applications, or the like.

The operating system 414 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, OR Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 420 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 420 can be single core, multiple core, or include more than one processing elements. The processor 420 can be disposed on silicon or any other suitable material. The processor 420 can receive and execute instructions and data stored in the memory 410 or the hard drive 430.

The storage device 430 can be any non-volatile type of storage such as a magnetic disc, EEPROM, Flash, or the like. The storage device 430 stores code and data for access applications.

The I/O port 440 further comprises a user interface 442 and a network interface 444. The user interface 442 can output to a display device and receive input from, for example, a keyboard. The network interface 444 connects to a medium such as Ethernet or Wi-Fi for data input and output. In one embodiment, the network interface 444 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A gateway network device on a data communication network, having accelerated hardware assistance for passive link quality measurement for software based link selection, the processor comprising:

a processor having hardware acceleration enabled during passive link quality measurement, wherein the processor comprises a forwarding engine to passively gather link quality details from existing network sessions concerning a plurality of links, wherein the link quality details comprise latency, jitter and packet loss;

a memory, communicatively coupled to the processor, and comprising an operating system, wherein the operating system comprises an SD-WAN path selection module to receive the link quality details gathered by the forwarding engine of the processor, the SD-WAN path selection module identify a link from the plurality of links for data packets of a current session using the link quality details; and a transmission module, communicatively coupled to the processor as an input and communicatively coupled to the data communication network as an output, to send data packets of the current session over the selected link.

2. The gateway network device of claim 1, wherein the link quality details further comprise voice call quality.

3. A method in a gateway, on a data communication network, having accelerated hardware assistance for passive link quality measurement for software based link selection, the gateway comprising:

enabling hardware acceleration during passive link quality measurement, passively gathering link quality details from existing network sessions concerning a plurality of links, wherein the link quality details comprise latency, jitter and packet loss;

forwarding, by a forwarding engine of the processor, the link quality details to an operating system;

identifying a link from the plurality of links for data packets of a current session using the link quality details; and transmitting data packets of the current session over the selected link.

* * * * *